Nov. 19, 1929.   C. R. SHORT   1,735,982
RESILIENT CONNECTER
Filed Dec. 11, 1924
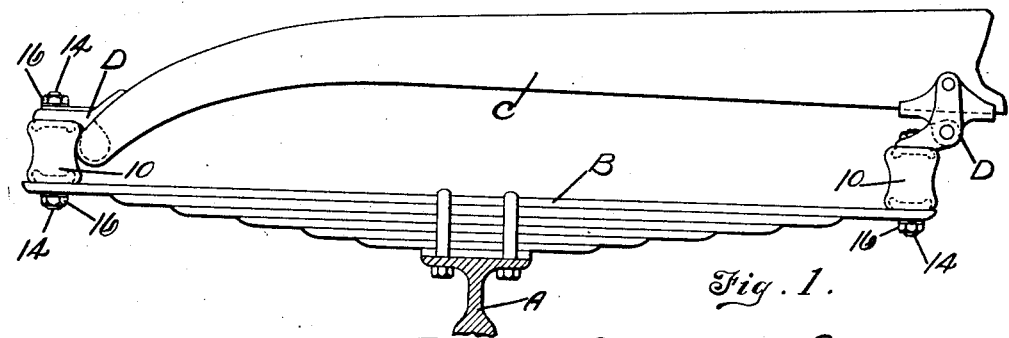
Fig. 1.
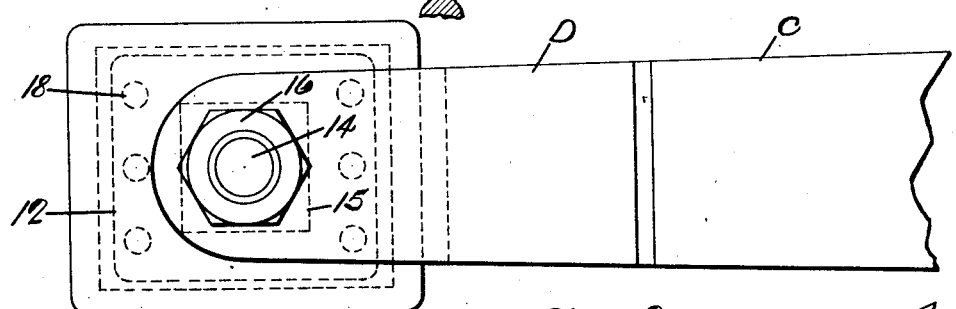
Fig. 2.
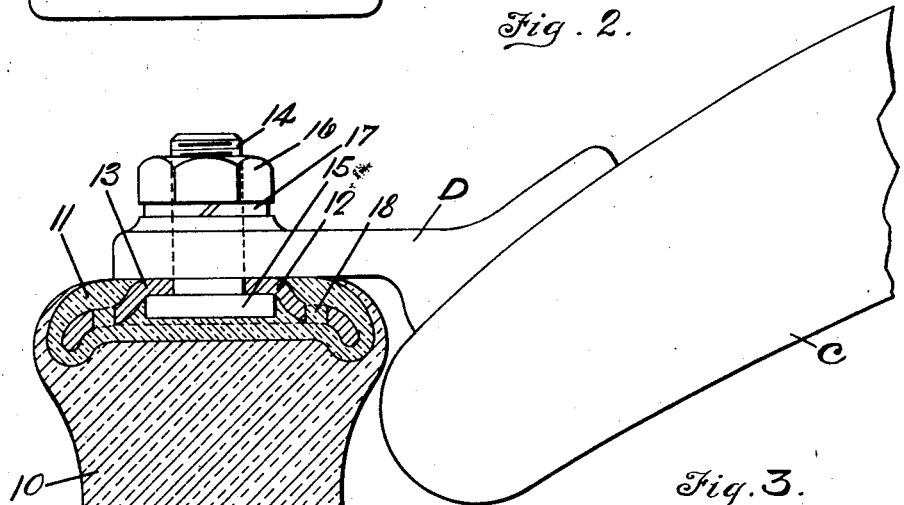
Fig. 3.
Inventor
Charles R. Short
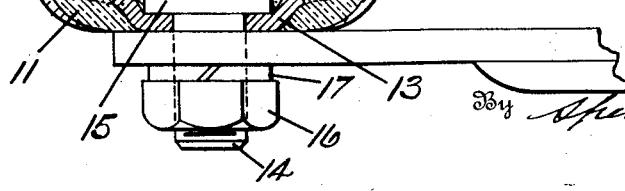
By Spencer, Sewall & Hardman
his Attorneys Patented Nov. 19, 1929

1,735,982

UNITED STATES PATENT OFFICE

CHARLES R. SHORT, OF DAYTON, OHIO, ASSIGNOR TO GENERAL MOTORS RESEARCH CORPORATION, OF DAYTON, OHIO, A CORPORATION OF DELAWARE

RESILIENT CONNECTER

Application filed December 11, 1924. Serial No. 755,216.

This invention relates to resilient members designed to connect or be interposed between parts having a limited movement with respect to each other in order to absorb vibration and prevent noise. It relates, more particularly, to devices of the kind intended for use on vehicles as spring connecters, shackles or at any point where a strong yieldable connection is desired.

The object of the invention is to impart durability, freedom from wear through dust, and general effectiveness to devices of the type mentioned.

The invention comprises a resilient connecter, comprising an elastic block, preferably of tough elastic rubber of such cross sectional dimensions as to withstand heavy compression and extension strains. Imbedded in each of the opposite ends of the said block of elastic rubber is a mass of hard rubber, which encloses an anchor plate, preferably of metal, to each of which is secured a member projecting from the connecter that serves to attach said connecter between two external members in its position of service.

In the accompanying drawings, in which like reference characters indicate like parts throughout the several views, Fig. 1 is a fragmentary side elevation showing connecters, made in accordance with this invention, applied between the ends of a leaf spring and a sill of a vehicle frame.

Fig. 2 is a plan view on an enlarged scale of the parts shown at the left of Fig 1 and Fig. 3 is a side elevation, showing in vertical section the parts shown in plan in Fig. 2.

In the drawings, 10 indicates a block of rubber made of a relatively stiff rubber compound which, when cured, forms a resilient mass of tough rubber. Imbedded in opposite ends of the block 10 are masses of hard rubber 11 made of a compound which, when cured, will produce hard, strong, relatively inelastic bodies. Embraced by the masses of hard rubber 11 are anchor plates 12, preferably of metal. These plates may be embossed as shown at 13. The embossed portions are perforated to permit the passage of an attaching member such as the shank of a bolt 14, the head 15 of which fits within the concave seat formed by the embossed portion. Each anchor plate 12 may have holes 18, into which the rubber or vulcanizable material may be caused to flow during molding to assist in securing the anchor plate in place. The shanks of the bolts 14 are adapted to pass through holes formed in the members to which the connecter is to be attached and the nuts 16, bearing upon lock washers 17, serve to hold the connecter in place with respect to said external members.

In the accompanying illustrations, the connecter described is shown in use as a spring connecter or spring shackle. In Fig. 1, A indicates a vehicle axle, B a leaf spring, secured to the axle, C the end portion of a vehicle sill and D, brackets connected to the sill which are perforated to receive the shank of bolt 14 as previously indicated. The longest leaf of the spring B is also perforated at its extremities for receiving the shanks of the other bolts 14.

The described connecter may be made by mixing a rubber compound of suitable ingredients so proportioned as to cure into a tough elastic body in accordance with practices well known to those skilled in the art of rubber manufacture. Similarly a compound for the inserts or imbedded masses 11 may be mixed of ingredients and proportions suitable to produce a hard, relatively inelastic mass of rubber. The compound for the hard rubber may be preferably rolled or pressed into sheets. The shanks of bolts 14 may then be passed through the openings in anchor plates 12; thereafter a sheet of hard rubber compound may be folded around each anchor plate so as to substantially envelop it. Then the fastening members, including bolts 14 and anchor plates 12, enveloped by the sheets of hard rubber compound, may be placed in a suitable mold with the tough rubber compound and the whole molded and cured into the desired form.

It will be understood that when heat and pressure are applied to mold and cure the mass, hard rubber compound will be squeezed into the orifices 18 of the plate 12, thus acting in the nature of integral rivets to secure the anchor plate within the connecter, and all parts within the mold will be vulcanized together.

The outer face of the bosses 13 are flush with the ends of the connecter and constitute firm surfaces which may be drawn tightly against the bracket D, or the long leaf spring B, by tightening the nuts 16.

The form of elastic connecter shown is free of external caps or metal parts between which dust and grit may penetrate and cause wear of the rubber by the movement of the metal parts with respect to the rubber during use.

While the embodiment shown and described illustrates the best form of the invention now known, as required by the patent law, it is to be understood that the scope of the invention is not intended to be limited to the particular form shown.

What is claimed and desired to be secured by Letters Patent is:

1. A resilient connecter comprising an elastic compression and extension resisting member of vulcanizable material, and an attaching member connected with an anchor device embedded in and vulcanized to the said elastic member, the anchor device including a metallic plate having an embossed portion, the outer surface of which is flush with the end of the elastic member.

2. A resilient connecter comprising an elastic compression and extension resisting member of vulcanizable material, and an attaching member connected with an anchor device embedded in and vulcanized to the said elastic member, the anchor being embraced within a mass of hard rubber which is embedded in the elastic member and vulcanized thereto and to the anchor device.

3. A resilient connecter comprising an elastic compression and extension resisting member of vulcanizable material, and an attaching member connected with an anchor device embedded in and vulcanized to the said elastic member, the attaching member comprising a headed bolt projected through the anchor device and the anchor device consisting of a metallic plate embraced by a mass of hard rubber embedded in the elastic member and vulcanized thereto and to the plate and bolt head.

4. The process of making resilient connecters which consists of preparing a rubber compound susceptible of forming a relatively tough elastic body when cured; preparing a sheet of rubber compound susceptible of forming a hard rubber mass when cured; enveloping an anchor plate of metal within the sheet of hard rubber compound; imbedding said anchor plate and enveloping sheet in the tough rubber compound, and then moulding the so formed body to a desired form, curing the rubber and vulcanizing the defined parts together.

5. A cup of hard rubber, a supporting cushion of tough rubber filling said cup and surrounding its edge and outer wall, and attaching means for securing said cup and cushion to an external member.

6. A cup of hard rubber, an anchor plate therein with an attaching stem projected therefrom, a supporting cushion of tough rubber filling said cup and surrounding its edge and outer surface, the parts being united by vulcanizing.

In testimony whereof I hereto affix my signature.

CHARLES R. SHORT.